Sept. 8, 1964   D. L. DANNER   3,147,938
AIRCRAFT WING STRUCTURE HAVING VARIABLE ANGLE OF INCIDENCE
Filed April 12, 1963   2 Sheets-Sheet 1
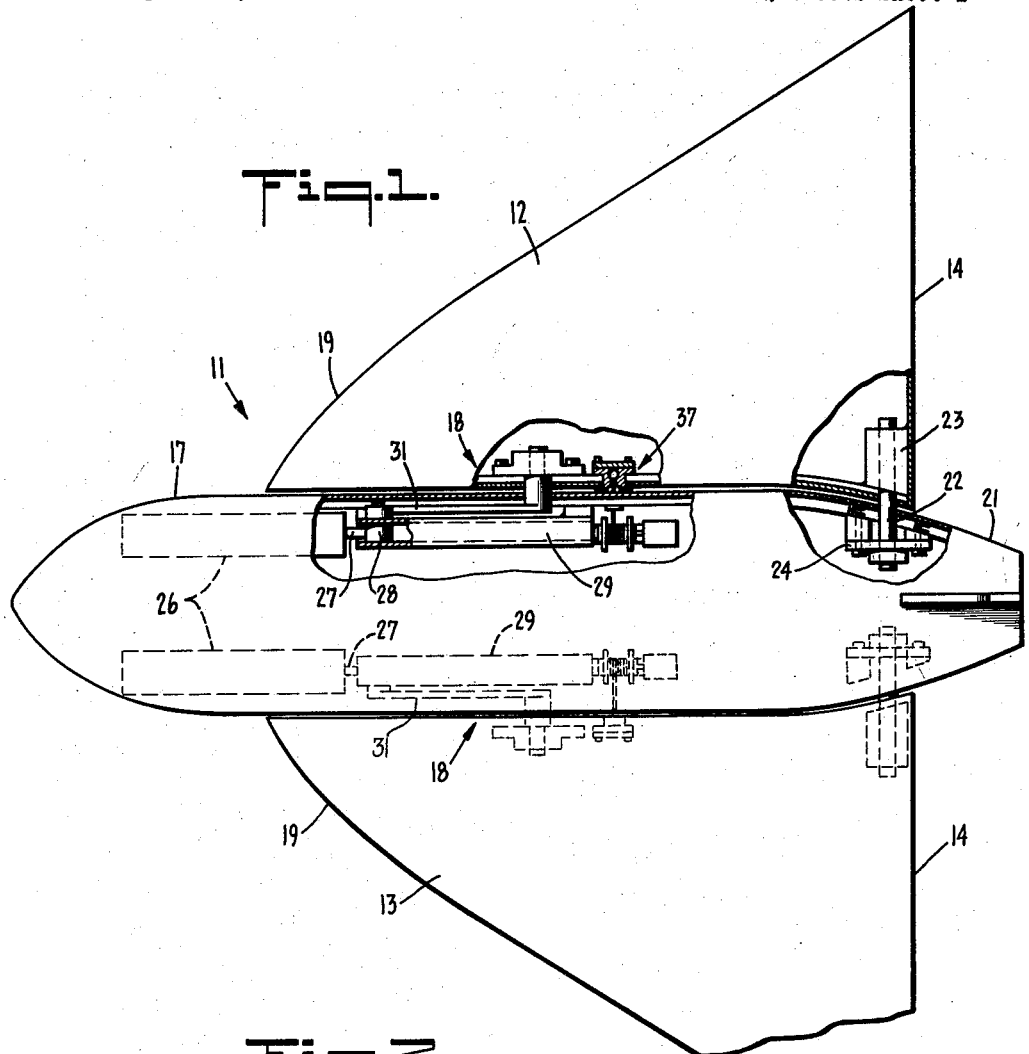
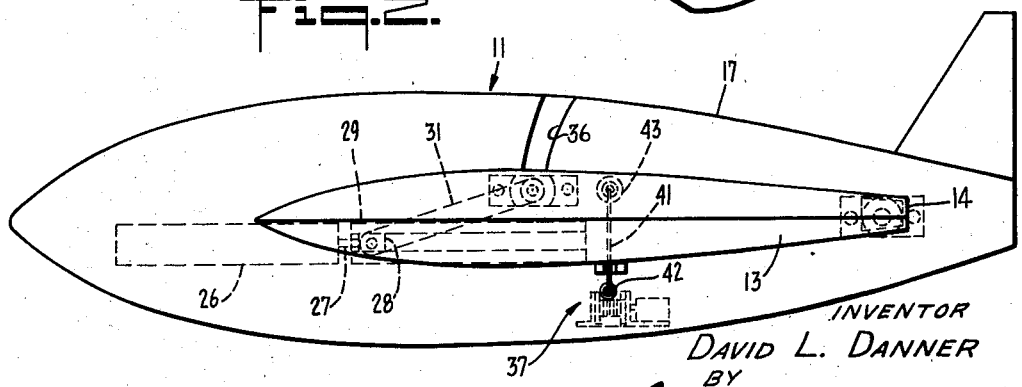
INVENTOR
DAVID L. DANNER
BY
Gardner & Zimmerman
ATTORNEYS Sept. 8, 1964             D. L. DANNER             3,147,938
AIRCRAFT WING STRUCTURE HAVING VARIABLE ANGLE OF INCIDENCE
Filed April 12, 1963             2 Sheets-Sheet 2
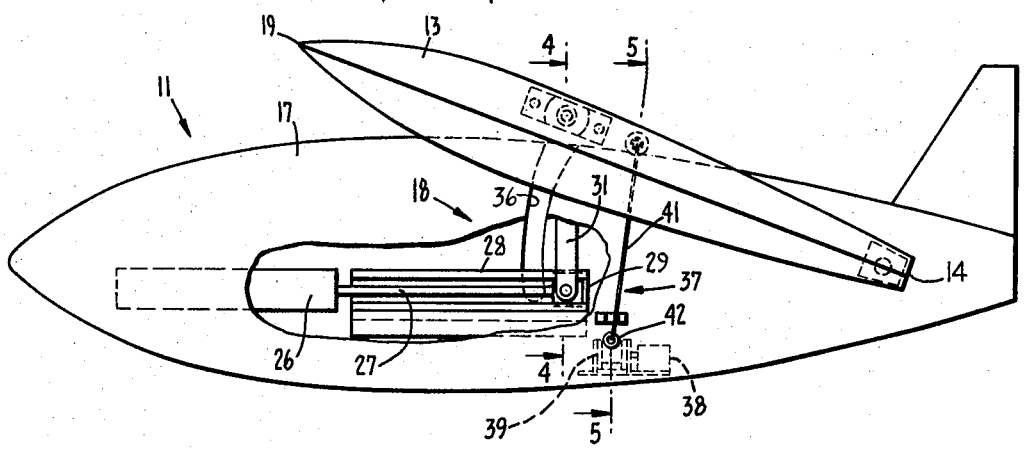
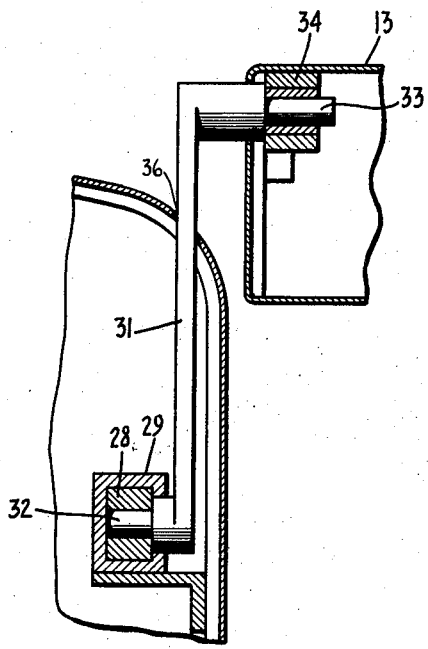
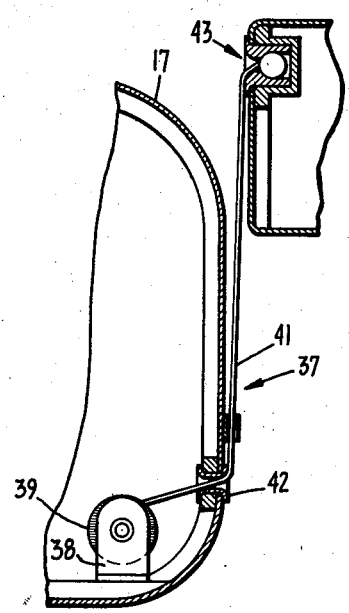
INVENTOR
DAVID L. DANNER
BY
*Gardner & Zimmerman*
ATTORNEYS

United States Patent Office 3,147,938
Patented Sept. 8, 1964

3,147,938
AIRCRAFT WING STRUCTURE HAVING
VARIABLE ANGLE OF INCIDENCE
David L. Danner, 37767 Fremont Blvd., Fremont, Calif.
Filed Apr. 12, 1963, Ser. No. 272,624
2 Claims. (Cl. 244—48)

This invention relates generally to improvements in aircraft construction, and more particularly to a novel structure for varying the angle of incidence of an airplane's wings.

A main object of the present invention is to provide an aircraft having wings with a variable angle of incidence to provide sufficient lift at relatively slow air speeds and to reduce the lift at very high speeds, and wherein the aerodynamic stability of the aircraft is not deleteriously affected by such provision.

Another object of the invention is to provide a structure for varying an airplane wing's angle of incidence over a relatively large range while maintaining the wing in secure relationship to the airplane's fuselage.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

FIGURE 1 is a plan view of an aircraft structure embodying features of the present invention.

FIGURE 2 is a side elevation view of the aircraft shown in FIGURE 1.

FIGURE 3 is a view similar to FIGURE 2 but with the aircraft's wings in a raised position having a larger angle of incidence than shown in FIGURE 2.

FIGURE 4 is a cross sectional view taken along the plane 4—4 indicated in FIGURE 3.

FIGURE 5 is a cross sectional view taken along the plane 5—5 indicated in FIGURE 3.

In broad terms, the present invention is embodied in an aircraft 11 having a pair of wings 12 and 13. The wings are each pivotally mounted adjacent their trailing edges 14 to the aircraft's fuselage 17, and are adapted for pivotal movement about an axis transverse to the longitudinal axis of the fuselage 17. Adjustable support means 18 are secured to each wing medially of its trailing edge 14 and leading edge 19, and serve to selectively raise and lower the wings relative to the fusealge. As best shown in FIGURE 1, the aircraft wings 12 and 13 each extend longitudinally along the fuselage to a position adjacent the tail end 21 thereof, to form a delta wing configuration. The aerodynamic stability of a delta wing configuration is particularly advantageous when used in conjunction with the present variable angle of incidence aircraft, and instability owing to variation of this angle are minimized.

With regard now to the details of the disclosed structure, the same reference numerals are given to like parts associated with the two wings 12 and 13, inasmuch as they are symmetrical. The wings are each pivotally mounted on the fuselage by means of a shaft 22 journalled for rotation in a bearing member 23 on the wing and another bearing 24 mounted on the fuselage. The means 18 include a cylinder 26 having a piston member 27 slidably disposed therein, and extending toward the rear of the fuselage in generally parallel alignment with the longitudinal axis thereof. The piston 27 includes a guide block 28 which is slidably disposed in an elongated guide member 29 adapted to constrain the piston 27 to longitudinal movement. The guide member 29 is rigidly secured to the fuselage. Conventional fluid pressure means, e.g., a hydraulic pressure line, can be used to cause reciprocation of the piston 27 in the cylinder 26. A link member 31 is pivotally secured between the piston 27 and the wing at a position thereon medially of its trailing and leading edges. As best shown in FIGURE 4, the link 31 is pivotally mounted on the guide block 28 by means of a stub shaft 32. The other end of the link 31 has a stub shaft 33 pivotally secured to a bearing block 34, which is mounted on the wing. Reciprocating movement of the piston thus causes the wing to pivot about its mounting shaft 22, thereby varying its angle of incidence. A slot 36 is provided in the side of the fuselage, and the link 31 extends through this slot.

Flexible cable means 37 are used to secure the wings in position against very high lift forces, and also are used in lowering the wing against such forces. More specifically, a suitable motor 38 is disposed in the fuselage 17 and is adapted to drive a rotatable spool member 39 on which is wound an elongated flexible cable 41. The cable extends through an aperture 42 in the fuselage, and is secured to the wing at a position 43 disposed rearwardly of the connection of the link 31. As the plane increases its speed in flight the upward lift and drag forces on the wings also increase. Thus, to pull down the wing to reduce the angle of incidence and thereby the drag forces, the motor 38 is operated to wind the cable 41. This is in addition to the hydraulic retraction of the piston 27.

From the foregoing it is apparent that the present invention provides a variable angle of incidence structure affording high structural and aerodynamic stability, and which is particularly suitable for use with high speed aircraft.

What is claimed is:

1. In an aircraft, the combination comprising, a fuselage, a pair of delta wings each extending laterally from opposite sides of said fuselage, said wings each being pivotally mounted on said fuselage adjacent their trailing edges, and adjustable support means secured between said fuselage and said wings for pivoting said wings to vary the angle of incidence thereof, said support means including means defining at least one fluid pressure piston chamber and a piston member slidably mounted therein, linking means secured between said piston member and said wings, and flexible cable means secured between said fuselage and said wings, said cable means and linking means each being secured to said wings substantially medially of the leading and trailing edges thereof.

2. In an aircraft, the combination comprising, a generally elongated fuselage, a pair of wings each extending laterally from opposite sides of said fuselage and extending longitudinally along said fuselage from a medial portion thereof to a position adjacent the tail end thereof to form a delta wing configuration, said wings each being pivotally mounted on said fuselage adjacent their trailing edges and adapted for pivotal movement about an axis disposed transversely to the longitudinal axis of said fuselage, means defining a pair of hydraulic piston chambers disposed in said fuselage and extending longitudinally relative thereto, a pair of pistons each slidably mounted in one of said chambers and having rod portions extending rearwardly of said chambers, a pair of guide members each secured adjacent the rearward ends of one of said piston rod portions, means defining a longitudinal guide channel secured to said fuselage in which said guide members are slidably mounted for constraining said rod portions to longitudinal reciprocal movement, fluid pressure means for actuating movement of said pistons, a pair of link members each pivotally secured between one of said rod portions and one of said wings at a position medially of the forward and trailing edges of each wing, said fuselage having a pair of slots through which said links are movable, a pair of flexible cables each secured between said fuselage and one of said wings intermediate the trailing edges thereof and said link members, and means disposed in said fuselage for varying the length of the portion of each said cable extending between its corresponding wing and said fuselage.

References Cited in the file of this patent
UNITED STATES PATENTS

| | | |
|---|---|---|
| 1,130,125 | Wilkins | Mar. 2, 1915 |
| 2,141,984 | Hilmy | Dec. 27, 1938 |
| 2,731,216 | Dillman | Jan. 17, 1956 |